Sept. 23, 1952     S. L. WITTENBERG     2,611,724
FILM SPLICER
Filed July 21, 1947     2 SHEETS—SHEET 1
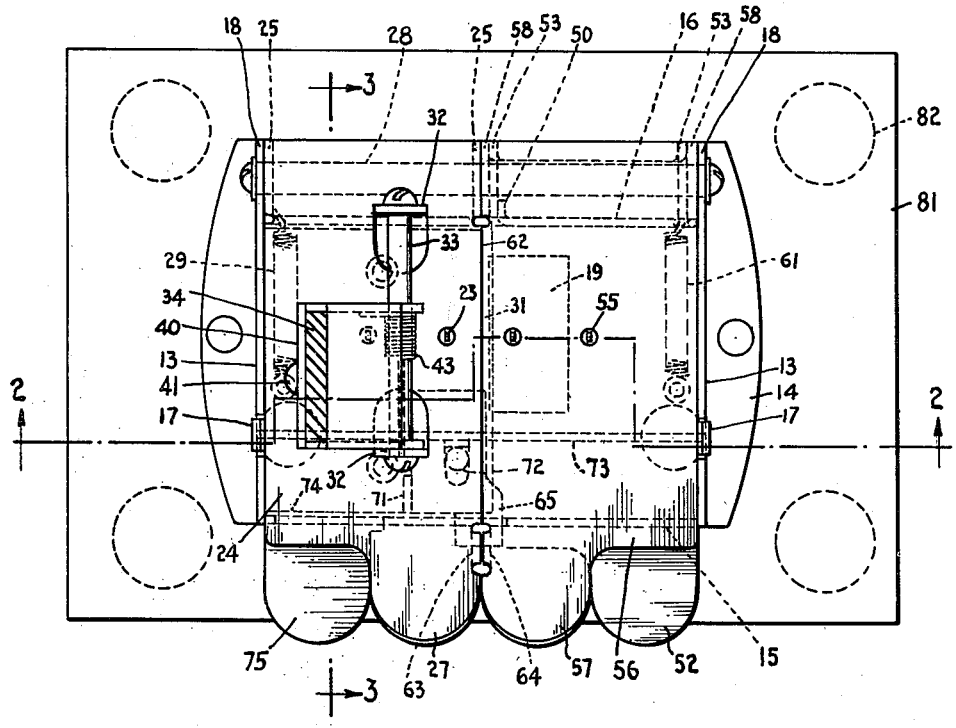
Fig. 1
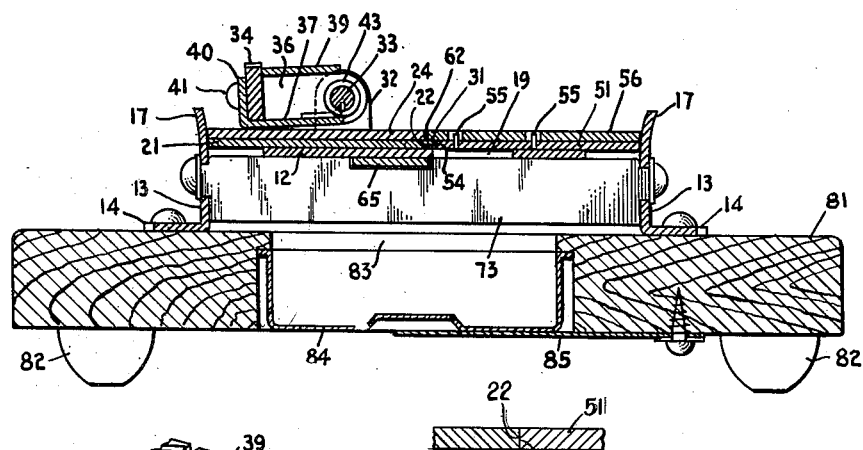
Fig. 2
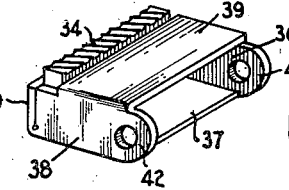
Fig. 7
Fig. 2A
INVENTOR.
SIGBERT L. WITTENBERG
BY
*M. Theodore Simmons*
ATTORNEY Sept. 23, 1952  S. L. WITTENBERG  2,611,724
FILM SPLICER
Filed July 21, 1947  2 SHEETS—SHEET 2
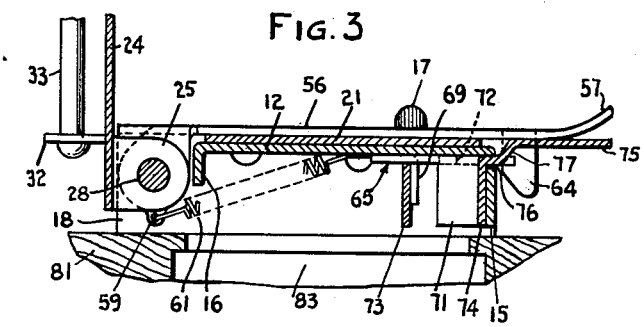
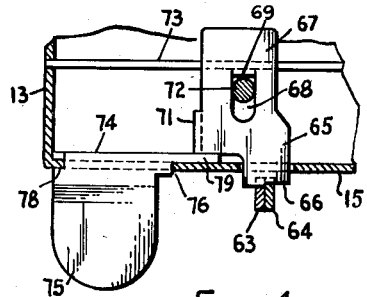
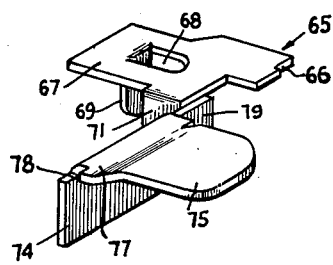
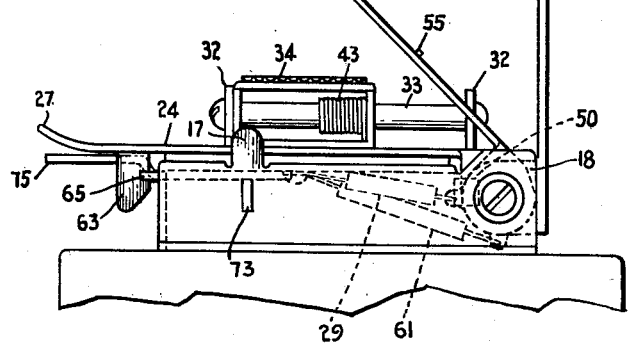
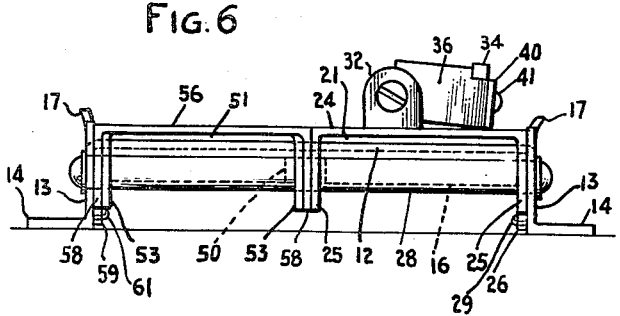
INVENTOR.
SIGBERT L. WITTENBERG
BY
M. Theodore Simmons
ATTORNEY Patented Sept. 23, 1952

2,611,724

UNITED STATES PATENT OFFICE 2,611,724

FILM SPLICER

Sigbert L. Wittenberg, Belle Harbor, N. Y.

Application July 21, 1947, Serial No. 762,281

12 Claims. (Cl. 154—42.1)

My invention relates to motion picture film splicers.

Film splicers heretofore devised for non-professional use have been complicated to operate and have had the probability of too great a factor of human error in their use, which frequently spoiled or destroyed the results. Furthermore, the design of film splicers has been such that an imperfect splice was often obtained through structural faults in the splicer.

Among the objects of my invention are to provide a construction of film splicer in which the factor of human error is substantially eliminated, and in which uniformly good results are assured.

It is another object of my invention to provide a film splicer in which uniform pressure is applied to the splice during the sealing step.

It is another object of my invention to provide a construction of film splicer in which pivoted cover plates are raised simultaneously, and in which it is not possible to open the splicer in sections after the splice has been completed.

It is a further object of my invention to provide a construction of splicer in which functions are combined so as to facilitate the work.

It is a further object of my invention to provide a novel construction of film splicer made entirely from stampings and assembled in a manner to be rugged and fool-proof in service.

It is a further object of my invention to provide a friction brake to maintain the movable table in its raised positions.

Other and further objects of my invention will be understood from this specification taken in conjunction with the accompanying drawings, in which:

Fig. 1 is a plan view of the film splicer according to my invention;

Fig. 2 is a vertical section on the irregular line 2—2 of Fig. 1;

Fig. 2A is an enlarged section of a portion of Fig. 2 showing the cooperation of the cutting edges of the film splicer;

Fig. 3 is a vertical section on the line 3—3 of Fig. 1, one of the cover halves being raised and parts being broken away to facilitate the illustration;

Fig. 4 is an enlarged fragmentary cross sectional view showing the latching arrangement;

Fig. 5 is a side elevation with the movable table and its cover half shown in raised positions;

Fig. 6 is a rear elevational view of the apparatus of Fig. 1;

Fig. 7 is a perspective view, in enlarged detail of the scraper element, and

Fig. 8 is a perspective view, in enlarged detail, of the latch mechanism.

Referring to the drawings, the base comprises a one piece stamping formed to provide a floor 12, depending side walls 13 from which project laterally a pair of mounting flanges 14, a depending front wall 15 and a depending rear wall 16. Also formed out of the same stamping are the short upstanding guiding ears 17 and the combined mounting and guiding ears 18 extending rearwardly beyond the rear wall 16. The floor 12 is provided with an aperture 19 for the disposal of the film clipping.

A half-table portion 21 is fixed to the floor 12 at one side thereof, and has an inner cutting edge 22, which partially overlies the disposal opening 19, and a plurality of pins 23 extending upwardly therefrom. The pins are of a size and spaced apart to engage in the sprocket perforations which are along one or both edges of a motion picture film and they also are spaced from the cutting edge 22 to properly position the film strip for an accurate splice.

The table half 21 has a pivoted cover and pressure plate 24 cooperating therewith. The plate is a one-piece stamping having at the rear thereof a pair of downturned mounting ears 25, on one of which is a depending tab 26, and at its front edge a forwardly extending upturned tongue 27, which serves as a convenient operating member for the use of the fingers. The ears 25 of the plate 24 are pivotally mounted upon a spindle 28 which extends between and is suitably mounted in the side walls 13, so that the cover plate pivots between an upright or raised position indicated in Fig. 3 to a lower locked position shown in Figs. 2 and 5. A coiled spring 29 is connected to the tab 26 and to the under side of the floor 12, which spring serves to raise the cover plate whenever it is released. It will be noted from Fig. 2 that the cover plate 24 is narrower than the table 21, so that in its lower position a narrow ledge 31 is left exposed along the cutting edge 22. As will be described, one portion of the film being spliced overlies this ledge 31, which supports the film for the scraping operation to remove the emulsion.

The cover plate 24 also has a pair of upturned ears 32 stamped out of the metal and between which is mounted a rod 33 for the scraper mechanism. The scraper comprises a rasp-like element 34 which is mounted in a box-like holder also formed from a single stamping bent to provide side wall 36, upper (in position of use) wall 37, side wall 38, lower wall 39, and front wall 40.

The lower wall 39 is narrower than upper wall 37 so as to leave a slot or pocket which receives the rasp element 34 that is then secured in place by means of screw 41. The side walls 36 and 38 have projecting ear portions 42 which are pivotally mounted upon the rod 33, and a coiled spring 43 is secured at one end to the rod and has its other end bearing against the wall 37 of the box so as to always return the scraper to the position of non-use shown in the drawings. The connection between the spring and the scraper is such that the movements of the scraper backwards and forwards along the rod 33 in the scraping operation will not be interfered with.

The splicer also comprises a second table half 51 which also consists of a stamping with a forwardly extending tongue 52, for convenience in raising and lowering the table, and two depending ears 53 at the rear thereof, which ears are pivotally mounted upon the spindle 28. Rear wall 16 of the base has tab 50 cut therefrom and bent into engagement with one of the ears 53 to form a friction brake holding table half 51 from falling from its raised positions. At its inner edge the table half 51 has a cutting edge 54 which cooperates with the cutting edge 22 in trimming the end of the film strip which is placed upon the table 21. The table 51 also has a plurality of upstanding pins 55 similar to the pins 23 and arranged for the same purposes.

Cooperating with the table 51 is a cover and pressure plate 56 which likewise is a stamping having a forwardly extending upturned tongue 57, corresponding to the tongue 27 on cover 24, and at its rear a pair of downturned ears 58 which are pivotally mounted on the spindle 28 and one of which has a tab 59 similar to the tab 26. A coiled spring 61 is secured to this tab and to the underside of the floor 12, the spring 61 being similar to the spring 29 in construction and in function.

It will be noted from Figs. 1 and 2 that the inner edges of the cover plates 24 and 56 are contiguous as indicated at 62 and they are formed as cutting edges to trim the end of the second strip of film, as will be described. Also, it is seen that the cover plate 56 is wider than the table 51 and overlies the ledge 31 of the fixed table member 21.

The means for holding the cover plates 24 and 56 in their lower positions will be described now. The inner edges of the cover plates 24 and 56 respectively have integral therewith downturned lugs or hooks 63 and 64 which are located adjacent the tongues 27 and 57 and the rear edges thereof are provided with notches to receive the sliding latch member 65. The latch projects through an opening in the upper portion of the front wall 15, as seen in Figs. 3, 4 and 5, and its forward edge is provided with a step 66 so that the latching member extends different distances into the notches in lugs 63 and 64 respectively, whereby the covers may be lowered separately into locking position without releasing the other cover.

The latch 65 comprises a flat plate 67 (Figs. 3, 4 and 8) extending rearwardly and provided with an opening 68, the portion that is cut out for the slot 68 being turned downwardly to form a finger 69, and at the forward edge of the plate portion 67 is a downturned portion 71 which constitutes an abutment. A guide pin 72 that is fastened on the underside of the floor 12 is received in slot 68 as seen in Fig. 3. The finger 69 engages a leaf spring 73 that is mounted in the side walls 13, as seen in Fig. 2, which spring continuously urges the latch to its forward position. The abutment 71 is engaged by the downturned or vertical portion 74 of the forwardly extending operating lever 75. The lever 75 extends through an opening 76 at the juncture of the base 12 and front wall 15, and the vertical portion 74 and the horizontal portion 75 are joined by a web 77, which may be bent if desired to offset the plane of the horizontal portion 75. It will be noted from Figs. 4 and 8 that one end of the web is notched as shown at 78, and the opposite side of the web is extended beyond the lever portion 75, as indicated at 79. The notch receives the uncut-away portion of the front wall 15, and the extension is such as to fill the space in the slot 76 after the lever is mounted in position. Thus, with the parts of the latch mechanism assembled, the spring 73, through the abutment 71, pushes the vertical portion 74 against the rear surface of the wall 15 and the lever is free to pivot about the lower edge of the opening 76, and there is no likelihood of this lever becoming disengaged.

The described mechanism may be operated in several ways to effect the splice.

One method of operation of the device is, as follows: The two cover members 24 and 56 and the movable table-half 51 are raised to vertical positions, or thereabouts. A strip of film is placed upon the pins 23 on the fixed table 21, with a portion of the film strip projecting beyond its cutting edge 22, and the cover plate 24 is lowered into latched position so as to clamp the film in place. Before or after the scraping operation, to be described, the movable table 51 is lowered alongside the table 21, thus clipping off the end of the film strip between the cutting edges 22 and 54, the clipped off end dropping through the disposal opening 19. A portion of the film strip is exposed on the ledge 31, and this portion is scraped to remove the emulsion coating.

Scraping is done by turning the scraper about 190° from the position of rest indicated in Figs. 1 and 2 and so as to bring the rasp 34 into engagement with the film on the ledge 31. By moving the scraper back and forth across the film with a slight pressure on the upper wall 37 of the scraper, the emulsion is removed. When the scraper is released, the spring 43 returns it to its position of rest, and a coating of a suitable cement is applied over the scraped surface.

The other strip of film being spliced is fitted upon the prongs 55 on the table portion 51, with a portion of this film strip extending beyond the inner edge of the cover 24 and overlapping the portion of film exposed on the ledge 31. With the second film strip in this position the cover plate 56 is lowered until its hook 64 passes the latch 65 which operation automatically clips off the projecting portion of the second film strip, between the cutting edges 62 of the two tables, and at the same time exerts pressure upon the overlapped film areas so as to effect the splice. By reason of the step 66 in the latch 65, the latch is not moved inwardly far enough to release the cover plate 24, and it remains in the latched clamping position. Attention is called also to the fact that the lugs 63 and 64 being located along the inner edges of the cover plates the maximum pressure is exerted along those edges, and hence directly upon the spliced area.

After a few seconds for the setting of the cement, the lever 75 is depressed to retract the latch 65 from the lugs 63 and 64 and both covers are raised simultaneously, by their springs, leaving the spliced film exposed to view upon the tops of the table members 21 and 51. The spliced film can now be lifted off without danger of damaging the splice or the film.

With the latching arrangement shown it is not possible to manually raise the covers or the movable table 51 as they are all firmly locked in position until such time as the lever 75 is depressed. Depressing the lever 75 releases merely the covers so that the springs 29 and 61 raise these covers out of the way without danger of damage to the film. If then the movable table 51 is manually lifted it will merely lift the film from the pins 23 still without likelihood of damage to the film.

If desired, the splicer may be mounted on a board 81 provided with casters 82 and having a central opening 83 closed at the bottom by a cup 84 which is held in place by means of a pivoted spring 85. The cup will receive the clipped off ends of the spliced film which fall through the disposal opening 19. However, the splicer mechanism may be mounted in conjunction with rewind mechanism, or otherwise, as best suits the convenience of the user.

Modifications may be made in the arrangement and location of the parts within the spirit and scope of this invention and such modifications are intended to be covered by the appended claims.

I claim:

1. In film splicing apparatus, a pair of table elements arranged to receive strips of film which are partially overlapped and are to be joined together, a pair of pivoted cover and pressure plates cooperating with said table elements, one of said plates having an edge portion in overlying engagement with the spliced area of said strips, and latching means engaging said plates substantially in line with said edge portion so that the latching force will be concentrated on said spliced area.

2. In film splicing apparatus, a pair of table elements arranged to receive strips of film which are partially overlapped and are to be joined together, a pair of pivoted cover and pressure plates cooperating with said table elements and having cooperating inner cutting edge portions adapted to clip off the splicing end of one of said strips, one of said edge portions being in overlying engagement with the spliced area of said strips, spring means for said cover plates and normally tending to raise the same, latching means engaging said plates substantially in line with said overlying edge portion so as to concentrate the latching force on said spliced area, and means for releasing said cover plates from said latching means.

3. In film splicing apparatus, a pair of table elements arranged to receive strips of film which are partially overlapped and are to be joined together, a pair of pivoted cover and pressure plates cooperating with said table elements, one of said plates having an edge portion in overlying engagement with the spliced area of said strips, spring means for said cover plates and normally tending to raise the same, latching means engaging said plates substantially in line with said edge portion, so as to concentrate the latching force on said spliced area, and means for substantially simultaneously releasing said cover plates from said latching means.

4. In film splicing apparatus, a base, a table fixed upon said base, a pivoted cover plate overlying and cooperating with said table so as to leave a portion of said table exposed as a ledge, said plate having a finger tab portion projecting beyond said base and a depending hook at the inner edge thereof, a pivoted table arranged to occupy substantially the same plane as said fixed table, a second pivoted plate overlying and cooperating with said pivoted table and also arranged to overlie said ledge, said second plate having a finger tab portion projecting beyond said base and a depending hook located on the plate forwardly of and in the plane of said ledge and adjacent said first hook, and latching means cooperating with said hooks to hold the plates upon the respective tables.

5. In film splicing apparatus, a base having means for holding strips of film partially overlapped, a pivoted pressure plate having an edge portion engaging the overlapped film portions and having a depending hook thereon substantially in alignment with said edge portion, a slidable latch plate engaging said hook and having a depending finger, means for guiding the latch plate in its sliding movements, a spring engaging said finger and normally biasing the latch plate into latching position with said hook, and means for moving said latch plate against the action of said spring.

6. In film splicing apparatus, a base having means for holding strips of film partially overlapped, a pivoted pressure plate having an edge portion engaging the overlapped film portions and having a depending hook thereon substantially in alignment with said edge portion, a slidable latch plate engaging said hook and having a depending finger, means for guiding the latch plate in its sliding movements, a spring engaging said finger and normally biasing the latch plate into latching position with said hook, and a pivoted lever extending outwardly from said base and having means engaging said latch plate to retract the same against the action of said spring.

7. In film splicing apparatus, a base having means for holding strips of film partially overlapped, a pivoted pressure plate having an edge portion engaging the overlapped film portions and having a depending hook thereon substantially in alignment with said edge portion, a latch plate mounted for sliding movement on said base and having a depending finger and a depending abutment, a spring engaging said finger and normally biasing the latch plate into latching position with said hook, and means for moving said latch plate against the action of said spring and comprising a lever pivoted in said base having a portion projecting outwardly from said base and a downturned portion engaging said abutment whereby depressing the projecting portion of the lever will cause the downturned portion to move rearwardly to slide the latch plate out of engagement with said hook.

8. In film splicing apparatus, a base having means for holding strips of film partially overlapped, an aperture in one wall thereof, a pivoted pressure plate having an edge portion engaging the overlapped film portions and having a depending hook thereon substantially in alignment with said edge portion, a latch plate mounted for sliding movement on said base and having a depending abutment, a spring engaging and normally biasing the latch plate into latching position with said hook, and means for moving said latch plate against the action of said spring and comprising a lever projecting through said base aperture and pivoted therein, and having a portion beneath said base and engaging said latch plate whereby depressing the projecting portion of the lever will slide the latch plate out of engagement with said hook.

9. In film splicing apparatus, a base having means for holding a strip of film, and a scraper mechanism pivotally mounted on the base and movable to a position to engage said film, said scraper comprising a holder having integral top, bottom, side and end walls and provided with mounting means therefor, a scraper element mounted upon said holder so as to engage said film when the scraper mechanism is moved, and a spring for moving the scraper from engagement with said film.

10. In film splicing apparatus, a base having means for holding a strip of film, a pivoted cover plate clamping said strip of film and having a finger tab projecting beyond said base, a pivoted table for holding a second strip of film in alignment with and to partially overlap the first mentioned film strip, said table also having a finger tab projecting beyond said base, a second pivoted cover plate overlying and cooperating with said table to clamp said second film strip and also having a finger tab projecting beyond said base, said second cover plate having an edge portion in overlying engagement with the spliced joint of said film strips, latching means for holding said cover plates in their clamping positions, and another finger tab projecting beyond said base and connected to and operable to release said latching means.

11. In a film splicing device, the combination according to claim 4, in which the latching means extends different distances into said hooks whereby said plates may be separately lowered into and raised from their latched positions.

12. In a film splicing device, a table adapted to hold two strips of film in partially overlapping relation, a pivoted first cover plate in overlying engagement with one of said strips, a pivoted second cover plate in overlying engagement with the other strip and with the overlapped area, a latch having separate parts respectively engageable with said cover plates to hold the same in their operative positions and a member actuating said latch to separately release said cover plates from said operative positions.

SIGBERT L. WITTENBERG.

REFERENCES CITED

The following references are of record in the file of this patent:

UNITED STATES PATENTS

| Number | Name | Date |
|---|---|---|
| 1,146,003 | Lang | July 13, 1915 |
| 1,173,142 | Bernard | Feb. 22, 1916 |
| 1,191,321 | Kunert | July 18, 1916 |
| 1,209,339 | Schippers et al. | Dec. 19, 1916 |
| 1,254,911 | Howell | Jan. 29, 1918 |
| 1,413,269 | Griswold | Apr. 18, 1922 |
| 1,445,045 | Slipper | Feb. 13, 1923 |
| 1,490,286 | Miehling | Apr. 15, 1924 |
| 1,591,500 | Tessier | July 6, 1926 |
| 2,385,353 | Frankel | Sept. 25, 1945 |